United States Patent [19]
Short et al.

[11] 3,717,336
[45] Feb. 20, 1973

[54] SHEET FEEDING AND ALIGNING APPARATUS

[75] Inventors: Charles R. Short, Cupertino; Ronald J. Billett, Sunnyvale, both of Calif.

[73] Assignee: FMC Corporation, San Jose, Calif.

[22] Filed: Nov. 8, 1971

[21] Appl. No.: 196,531

[52] U.S. Cl. ...........................271/9, 271/52, 271/58, 271/59
[51] Int. Cl. ..............................B65h 9/10, B65h 9/16
[58] Field of Search............271/9, 52, 53, 58, 59, 48, 271/49, 15, 14; 198/30

[56] References Cited

UNITED STATES PATENTS

| | | | |
|---|---|---|---|
| 1,136,562 | 4/1915 | Stokes et al. | 271/48 |
| 2,084,319 | 6/1937 | Charnock | 271/52 X |
| 3,375,003 | 3/1968 | Godlewski | 271/9 |
| 3,554,353 | 1/1971 | Raudat | 198/30 |
| 3,603,463 | 9/1971 | Billett et al. | 198/79 |

*Primary Examiner*—Harvey C. Hornsby
*Assistant Examiner*—Bruce H. Stoner, Jr.
*Attorney*—F. W. Anderson et al.

[57] ABSTRACT

An apparatus for aligning two sheets of veneer in parallel relationship and feeding the veneer while in that relationship to a receiving station with such apparatus including a section for storing several stacks of veneer, conveying means for advancing individual sheets of veneer from the storage stacks to an alignment section of the apparatus, laterally shiftable fences in the alignment section for moving the veneer into adjacent side-by-side relationship, and controls for automatically controlling the operation of the apparatus.

14 Claims, 17 Drawing Figures

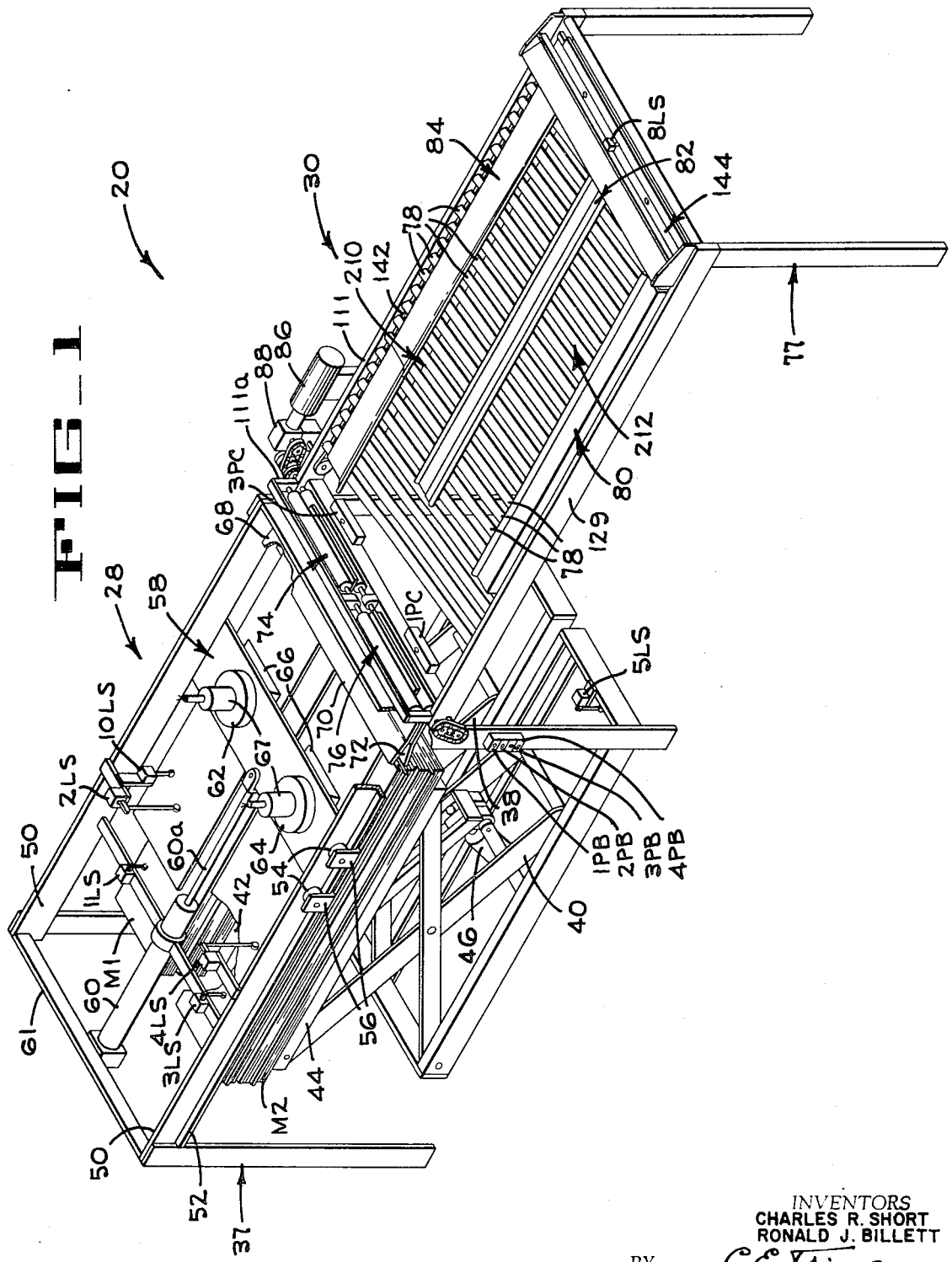

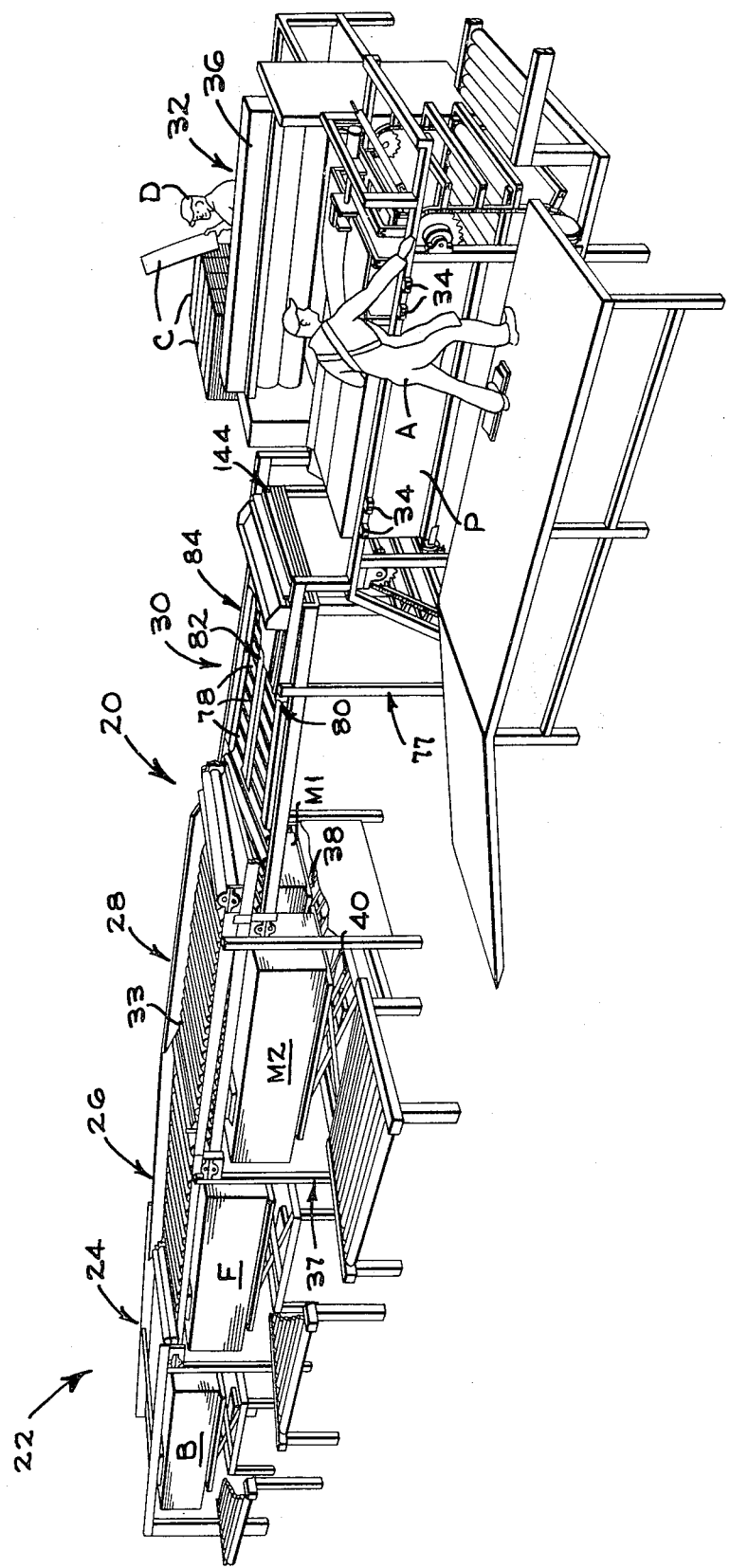

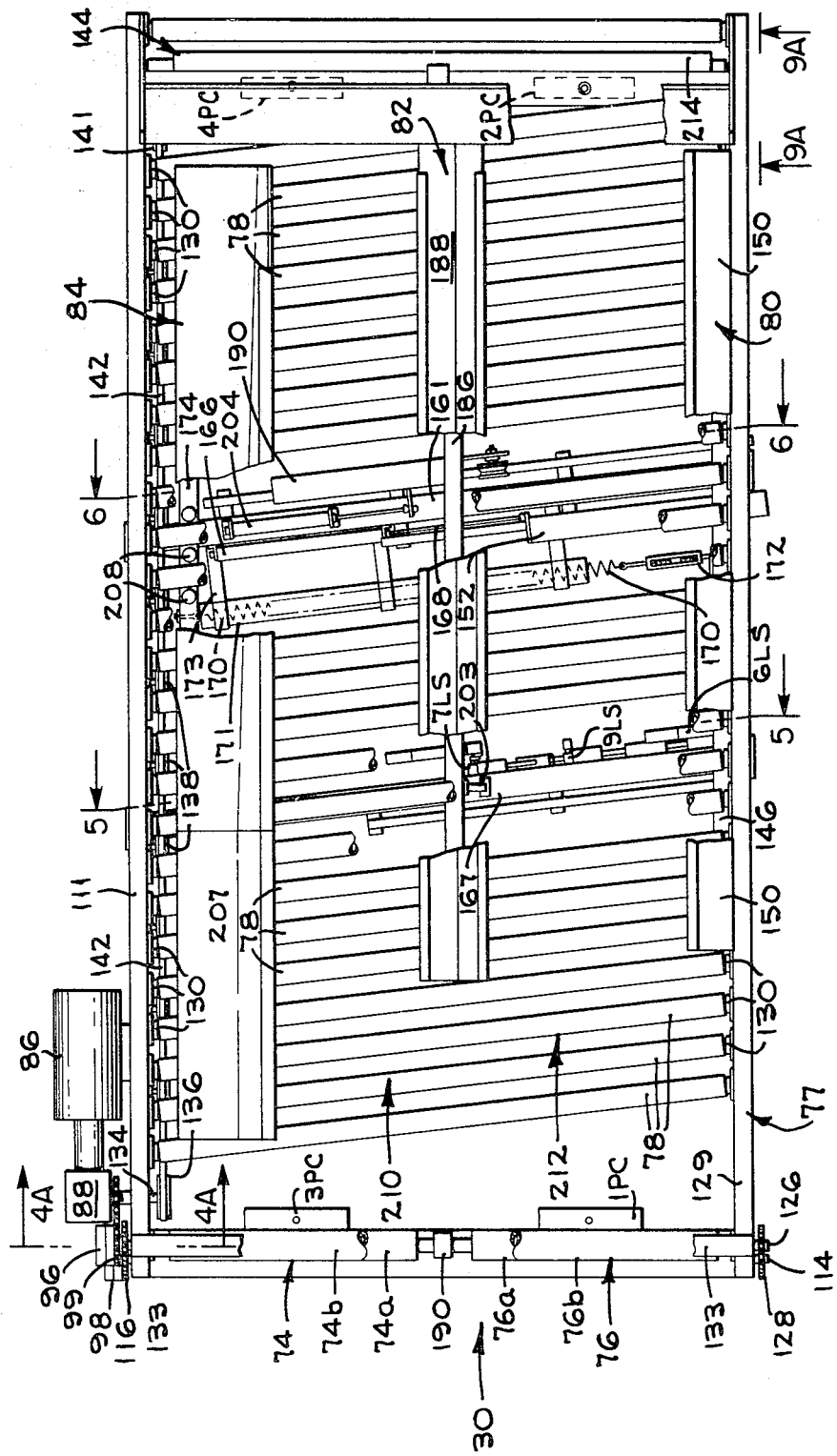

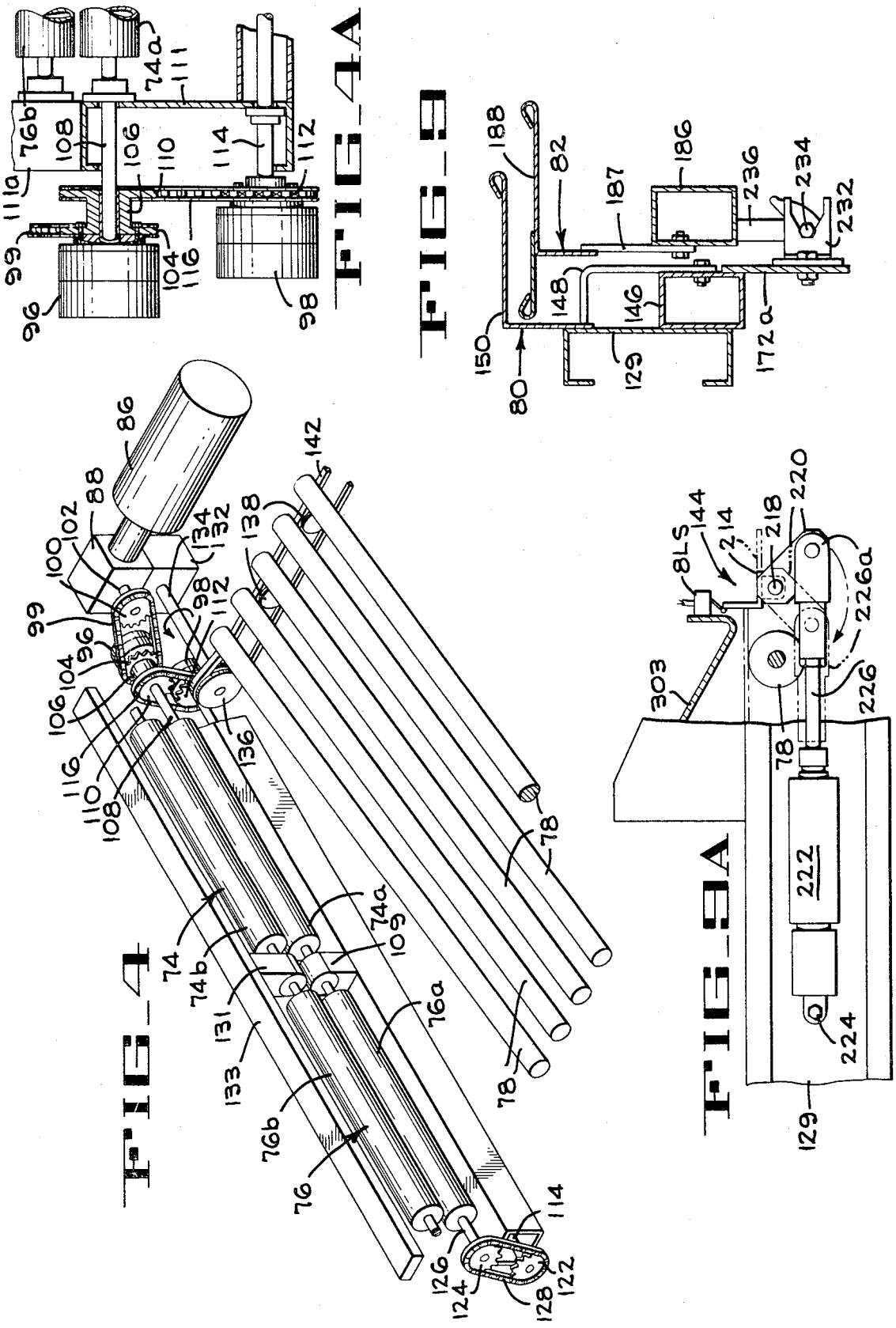

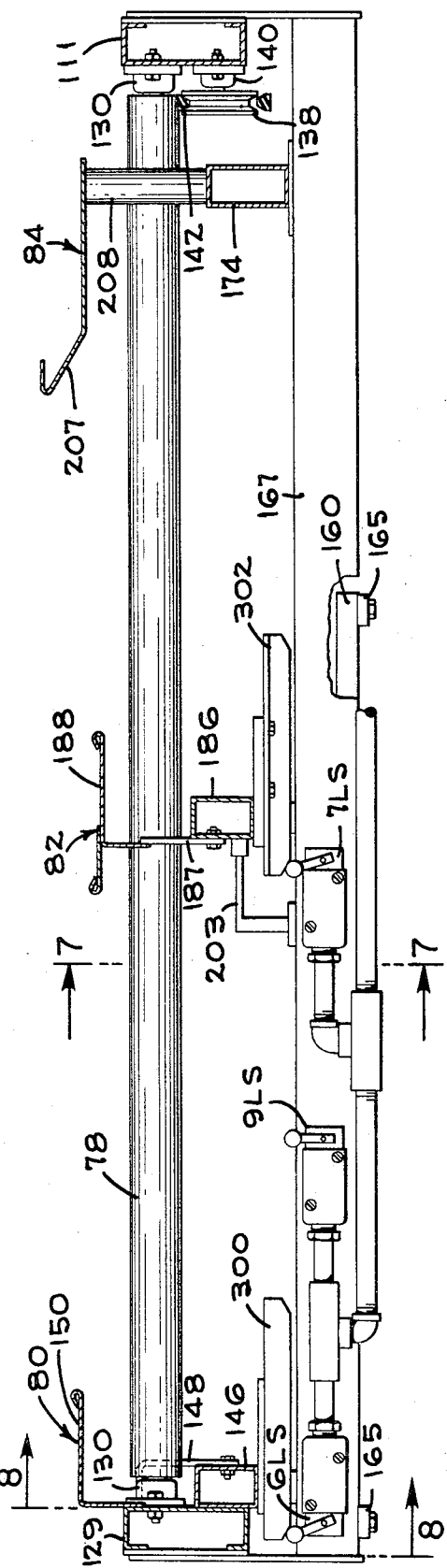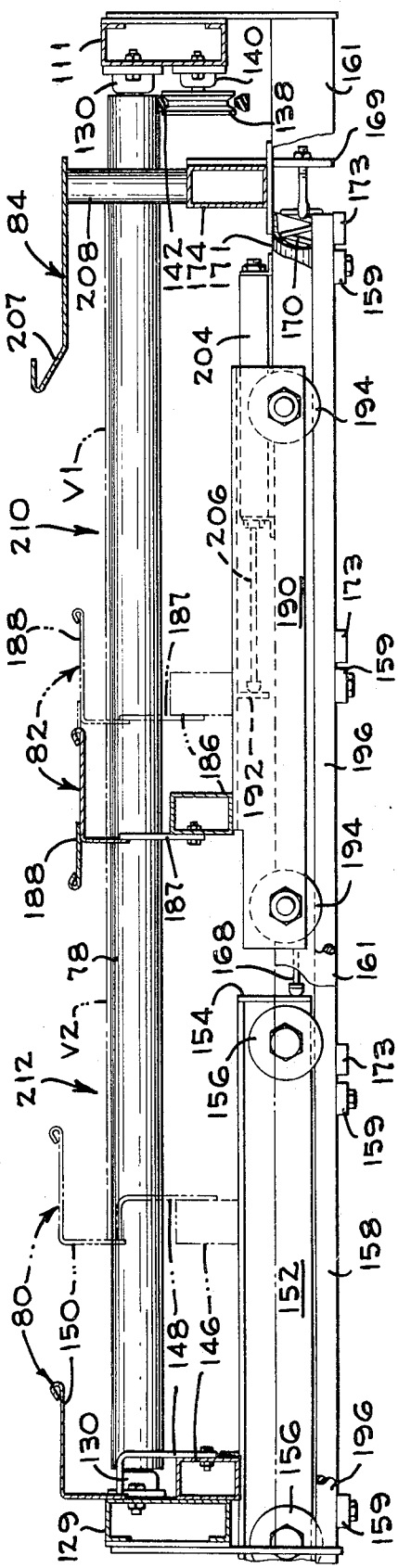

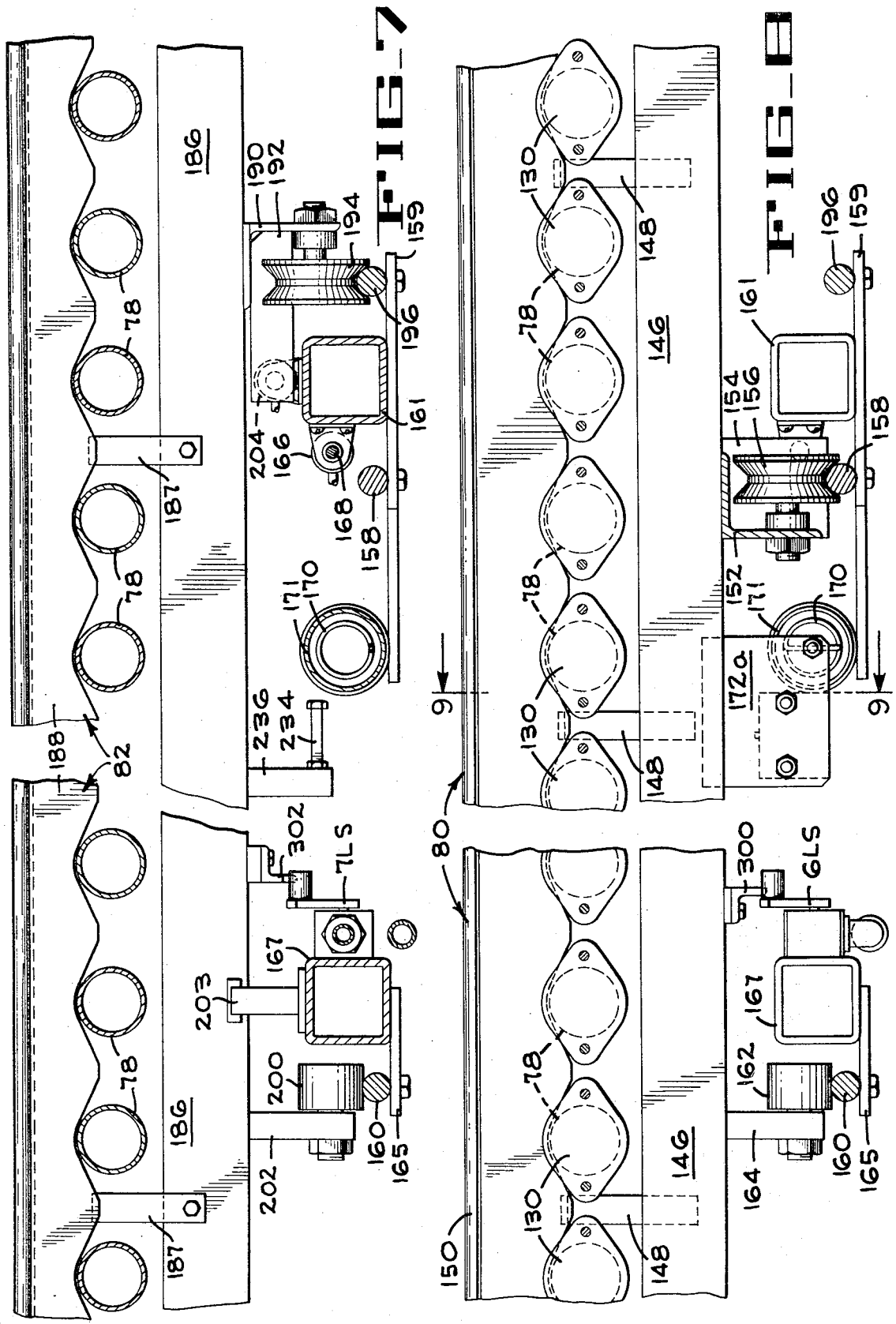

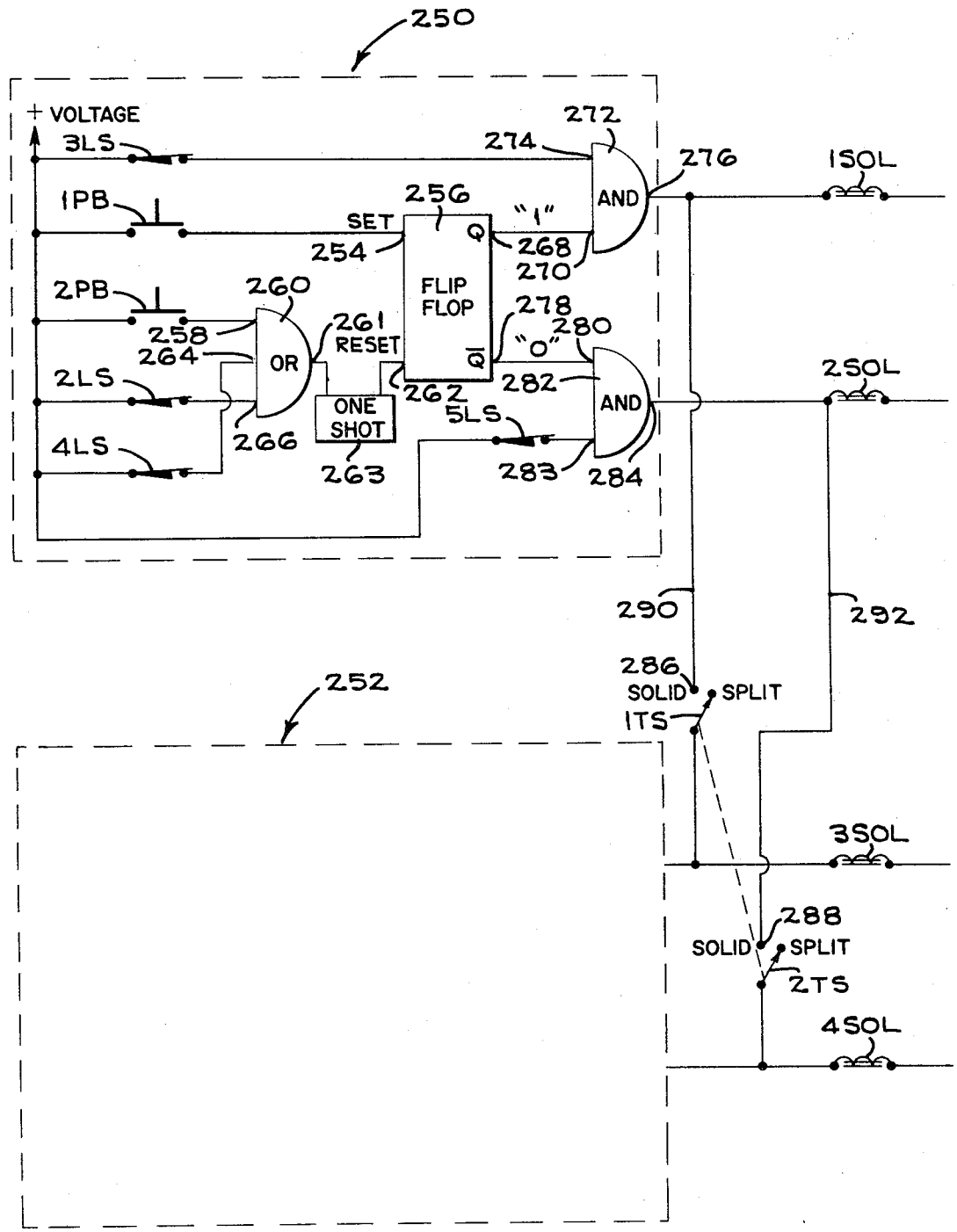
FIG_10

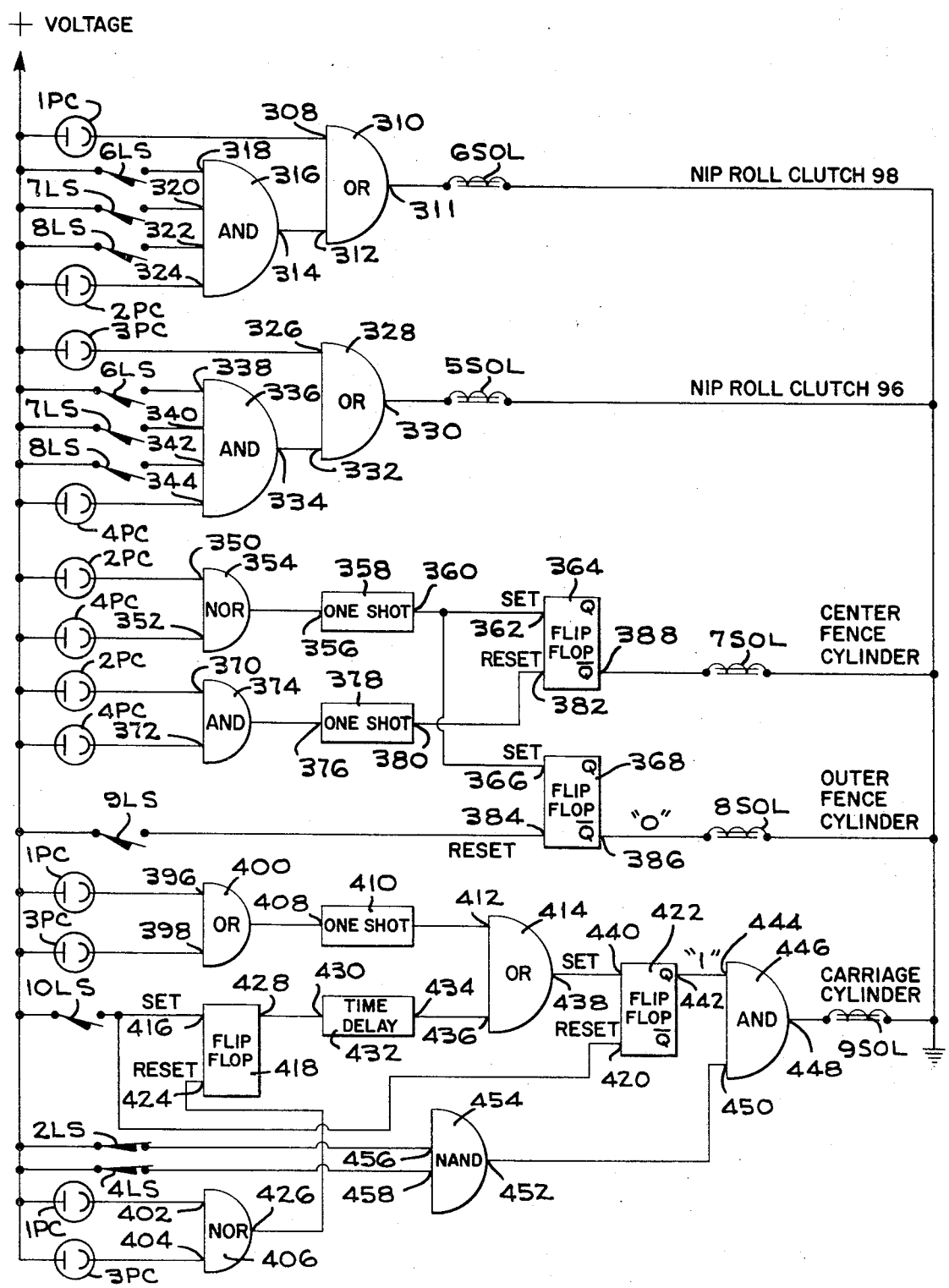
FIG_10A

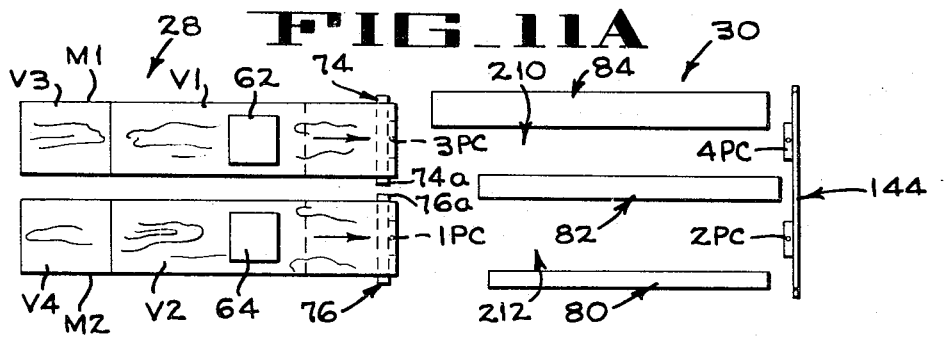
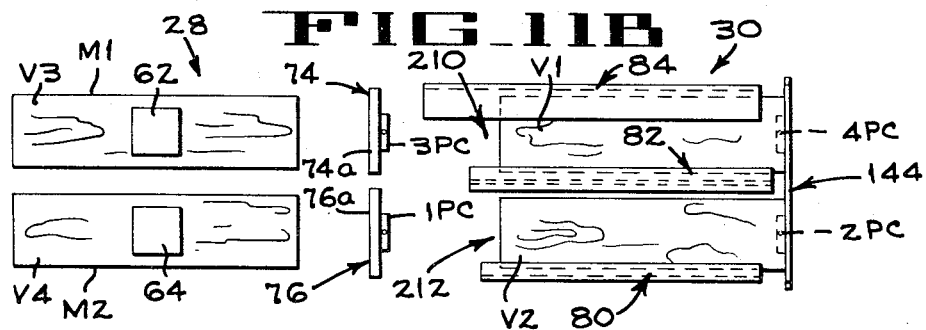
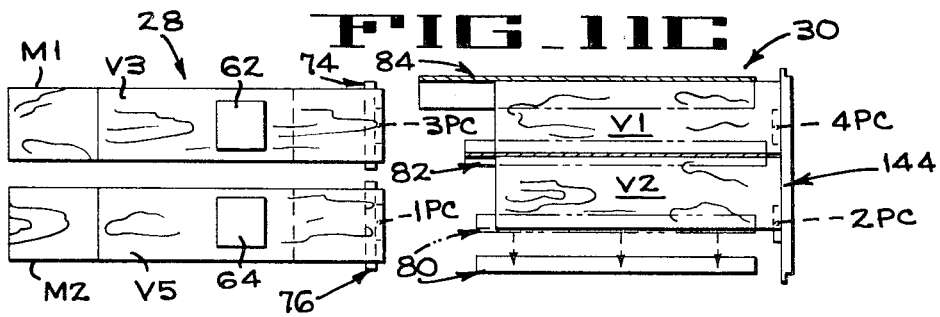
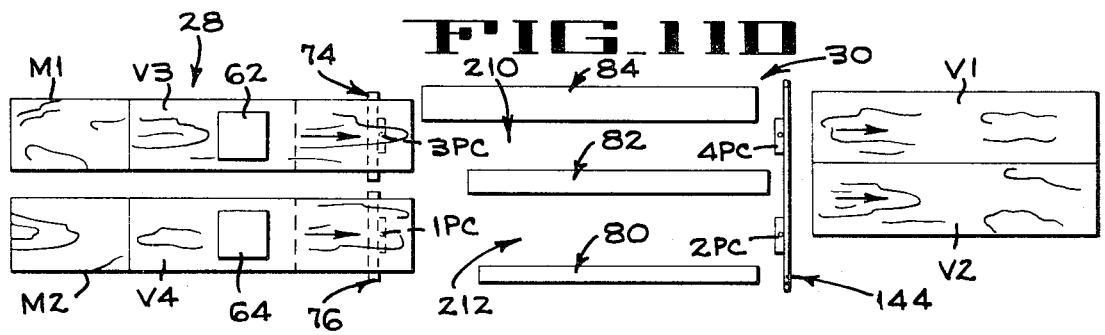

3,717,336

SHEET FEEDING AND ALIGNING APPARATUS

BACKGROUND OF THE INVENTION

1. Field of the Invention

The present invention pertains to apparatus for feeding and aligning sheet material, and more particularly, it pertains to apparatus for feeding and aligning sheets of veneer.

2. Description of the Prior Art

In the plywood fabricating art, it is a frequent practice to use two half-sized sheets of veneer (commonly called split-center veneer) aligned in side-by-side relationship to comprise one of the middle lamina of the plywood. Even though there are plywood fabricating machines that store sheets of veneer and automatically advance the sheets to an assembling station, to applicants' knowledge, no apparatus is available that will align and feed split-center veneer. Prior to the present invention it was necessary to provide at least one, and normally two, workers to feed the split-centered middle lamina to the assembling station of the plywood fabricating machines. This, of course, added many man-hours of labor to the cost of fabricating plywood. Accordingly, the plywood industry has for some time been desirous of an apparatus that will eliminate this burdensome labor overhead.

SUMMARY OF THE INVENTION

The apparatus of the present invention is adapted to simultaneously remove one sheet at a time from several stacks of sheet material and align the several sheets in adjacent parallel relationship whereby they can be fed in this relationship to a receiving station.

In a preferred embodiment of the invention the apparatus is comprised of an alignment section where two sheets which have been removed from the stacks are aligned along their opposed longitudinal edges and moved into closely spaced positions for feeding to a receiving station.

The apparatus of the present invention is provided with means which are automatically operated to feed sheets of material upon a conveyor. Longitudinally extending fences positioned above the conveyor define areas thereon into which the individual sheets pass. The fences are transversely movable whereby sheets lying therebetween can be shifted into adjacent side-by-side relationship and properly aligned for feeding to a receiving station. The sheets are held in adjacent parallel relationship until a retaining gate at the output end of the conveyor is opened by the operator of the apparatus to allow the sheets to be fed to the receiving station by the conveyor. The apparatus itself is fully automatic. Manual assistance is required to operate the retaining gate only when it is desired that the previously aligned sheets be fed to the receiving station.

Accordingly, it is an object of the present invention to provide an apparatus for aligning sheets of material in adjacent side-by-side relationship.

It is another object of the present invention to provide an apparatus for automatically removing individual sheets of material from stored stacks of the material and aligning the individual sheets in adjacent side-by-side relationship.

BRIEF DESCRIPTION OF THE DRAWINGS

FIG. 1 is an isometric view of the alignment apparatus of the present invention with portions thereof being broken away for the purpose of clarity.

FIG. 2 is an isometric view of a plywood fabricating machine which incorporates the alignment apparatus of FIG. 1.

FIG. 3 is an enlarged top plan of a portion of the alignment apparatus of FIG. 1 with parts thereof being broken away for the purpose of clarity.

FIG. 4 is a fragmentary isometric view of the input end of the alignment apparatus of FIG. 3 particularly showing the drive mechanism for the feed rollers and the sheet advancing rollers.

FIG. 4A is an enlarged section taken on the line 4A—4A of FIG. 3 particularly showing the clutch-brake arrangements for controlling the feed rollers.

FIG. 5 is an enlarged transverse section taken along line 5—5 of FIG. 3.

FIG. 6 is an enlarged transverse section taken along line 6—6 of FIG. 3.

FIG. 7 is an enlarged longitudinal section taken along line 7—7 of FIG. 5 with portions of the alignment apparatus being broken away.

FIG. 8 is an enlarged longitudinal section taken along line 8—8 of FIG. 5 with portions of the alignment apparatus being broken away.

FIG. 9 is a section taken along line 9—9 of FIG. 8 particularly showing the means for connecting the two fences of the alignment apparatus of FIG. 3.

FIG. 9A is an enlarged diagrammatic side elevation, taken generally in the direction of the arrows 9A—9A of FIG. 3, particularly showing the construction and operation of the gate used to selectively block the passage of sheet material through the apparatus of the present invention.

FIGS. 10 and 10A are diagrammatic representations of the control circuitry for the alignment apparatus of the present invention.

FIGS. 11A, 11B, 11C and 11D are diagrammatic plan views of the alignment apparatus of FIG. 1 illustrating its manner of operation.

DESCRIPTION OF A PREFERRED EMBODIMENT

For purposes of illustration and in order to disclose a specific application for the aligning apparatus 20 (FIG. 1) of the present invention, such apparatus will be described herein in connection with its use as a component of the plywood lay-up machine such as disclosed in U.S. Pat. No. 3,603,463 and 3,598,252 to Billett et al. It is to be understood, however, that the apparatus of the present invention would find utility in other systems wherein it is desired to align sheets of material in adjacent side-by-side relationship.

Referring now to FIG. 2, a plywood lay-up machine 22, of the type disclosed in the aforementioned U.S. Pat. No. 3,603,463 and 3,598,252, is there shown and will be seen to include a storage station 24 having a stack of back veneer B, a storage station 26 having a stack of face veneer F, the aligning apparatus 20 of the present invention which has a storage section 28 for adjacent stacks M1 and M2 of half-sized sheets of middle veneer and an alignment section 30, and an assembly station 32 where the various veneer which comprise a sheet of plywood are assembled. The lay-up machine 22 is operated by two workers A and D located at the assembly station 32. Worker A is responsible for sequentially delivering the various veneer from the storage stacks along an overhead roller conveyor 33 to the assembly station by the use of electromechanical means which are operated by control switches 34 at the assembly station. Worker D is responsible for feeding core strips C through a gluing machine 36 at the assembly station in a manner such that worker A can lay the strips across and between the various veneer laminae in each sheet of assembled plywood. The assembled sheets of plywood are accumulated in a stack P at the assembly station 32 before they are individually pressed and trimmed in apparatus that is not disclosed herein. In the disclosed arrangement of the plywood lay-up machine, the sheets of veneer used for the middle lamina are approximately half the width of the back and face veneer. The stacks M1 and M2 of the middle veneer are arranged in spaced side-by-side relationship whereby after the veneer have been singulated, properly aligned, and moved into closely adjacent side-by-side relationship in the alignment section 30 of the apparatus, each pair of middle veneer will comprise a lamina which is substantially equivalent in size to each of the back and face veneer laminae.

The alignment apparatus 20 is best seen, from an overall viewpoint, in FIG. 1 wherein the storage section 28 of the apparatus will be seen to include a generally rectangular frame structure 37 and a pair of identical, independently operated, scissors-type lift tables, or elevators, 38 and 40, which may be of the type disclosed in U.S. Pat. No. 3,110,476 issued to W. A. Farris. The elevators respectively support the stacks M1 and M2 of the middle veneer on platforms 42 and 44, and the vertical movement of the platforms is regulated by identical, single-acting pneumatic cylinders 46, as will be explained more clearly hereinafter.

The frame structure 37 of the veneer storage section 28 has two longitudinally extending side members 50 along the top portion thereof, each member having on its outermost side an outwardly projecting track 52 (only one being shown in FIG. 1). Each track is adapted to support and guide a pair of rollers 54 which are rotatably mounted on laterally extending angled end portions 56 of a carriage 58, whereby the carriage is free to roll along the tracks 52 in a horizontal plane adjacent the top of the storage section. A double-acting pneumatic cylinder 60 is anchored to a cross member 61 of the frame 37 at its upstream end (the end furthest removed from the alignment section 30), and the projecting piston rod 60a of the cylinder 60 is attached to the carriage 58 so that extension and retraction of the piston rod will cause the carriage to reciprocate in the aforementioned plane.

Mounted on the carriage 58 in vertical alignment with the elevators 38 and 40 are identical vacuum heads 62 and 64, respectively. These vacuum heads may be similar to the vacuum heads disclosed in U.S. Pat. No. 3,599,968 to Billett et al., and will not be described in particular detail herein since the details of such structures are not critical to an understanding of the present invention. In general, these vacuum heads are characterized by a flexible skirt 66 at the bottom thereof, which is adapted to slide across the uppermost veneer in the associated underlying stack M1 and M2 and to hermetically seal the vacuum head against the uppermost veneer when a suction fan inside a housing 67 of the vacuum head is operated. Thus, subsequent movement of the carriage 58 will result in the corresponding movement of the veneer.

An elongated, transversely extending throat 68 comprising upper and lower guide members 70 and 72, respectively, is mounted across the downstream end of the storage section 28 of the apparatus 20 and at an elevation above the ground approximately the same as the elevation of the skirts 66 of the vacuum heads. The opposed guide members 70 and 72 are flared outwardly in the upstream direction whereby sheets being fed into the throat by the vacuum heads 62 and 64 will emerge from the restricted portion of the throat and be presented to the alignment section 30 of the apparatus in a narrow horizontal zone immediately adjacent two vertically arranged pairs of nip rollers 74 and 76 comprised of intermittently driven feed rollers 74a and 76a, respectively, and associated idler rollers 74b and 76b, respectively (FIG. 4).

The alignment section 30 includes, in addition to the pairs of nip rollers 74 and 76, a frame 77 which is connected to and aligned with the frame 37 of the storage section, a plurality of continuously driven friction conveyor rollers 78 arranged in a horizontal plane on the frame, a longitudinally extending outside fence 80 and a center fence 82 that are both positioned for lateral movement between the rollers, and a stationary side wall 84 adjacent one end of each of the rollers.

The feed rollers 74a and 76a (FIG. 4) are driven by a motor 86 acting through a gear box 88. A chain 99 is trained around a sprocket 100 that is fixed on the output shaft 102 of the gear box 88 which chain drives a sprocket 104 that is part of a free-wheeling double-sprocket unit 106 rotatably disposed on a drive shaft 108 carrying one of the lower feed rollers 74a. The drive shaft 108 is journalled at one end in a housing 109 and at the other end in a bearing (FIG. 4A) in a longitudinally extending frame member 111 of the frame 77. The other sprocket 110 of the double sprocket unit 106 mounts one end of a drive chain 116 the other end of which is secured about a free-wheeling sprocket 112 that is rotatably mounted upon a transfer shaft 114. The transfer shaft 114 lies transversely of the aligning apparatus 20 below the drive shaft 108 and is journalled at one end thereof in the longitudinally extending frame member 111 (FIG. 4A) and at the other end thereof in a second longitudinally extending frame member 129 of the frame 77. Fixed on the end of the transfer shaft 114 that is journalled in frame member 129 is a sprocket 122 which is in driving connection with a sprocket 124 through an endless drive chain 128. The driven sprocket 124 is fixed on a drive shaft 126 carrying the lower feed roller 76a. The drive shaft 126 is journalled at one end in the housing 109 and at its other end in the longitudinally extending frame member 129 of the frame 77. It will be appreciated that the transfer shaft 114 provide a driving connection between the drive motor 86 and the drive shaft 126 supporting the feed roller 76a.

Clutch-brake mechanisms 96 and 98, which provide for the transfer of driving power to the shafts 108 and 114 respectively, may be of the type designated FWCB manufactured by Horton Manufacturing Co., Inc. of Minneapolis, Minn. The clutch-brake mechanisms are identical and are basically comprised of a brake portion and a clutch portion. As is conventional, the clutch portion has a driving member and a driven member which are spring biased into disengaged positions but which are engageable if the spring bias is overcome by pneumatic pressure applied to the driven member through a pressure line. The brake portion is independent of the clutch portion and operates similarly in that a braking member is biased out of engagement with a movable plate member splined on the drive shaft on which the clutch brake mechanism is mounted. However, when the bias is overcome by pneumatic pressure supplied through a second pressure line, the braking member engages the movable plate member to stop rotative movement. Both pressure lines are connected at their other ends to a two-position solenoid valve which is operative to engage the clutch or the brake separately, but never to engage both of them together. Therefore, when the clutch is engaged the brake is always disengaged, and when the brake is engaged the clutch is always disengaged.

Clutch brake mechanism 96 is mounted on drive shaft 108 of feed roller 74a (FIG. 4A) in a manner such that the driven member of the clutch is keyed to the drive shaft 108 for unitary rotation with the drive shaft, and the driving member of the clutch is bolted to the sprocket 104 of the double sprocket unit 106 for unitary rotation therewith. It can therefore be seen that when the clutch is disengaged, the double sprocket unit 106 will continue to be rotated by the motor 86 acting through the drive chain 99 but the drive shaft 108 will remain motionless with the brake portion of the clutch-brake mechanism 96 preventing the shaft from rotating. When the clutch is engaged, in a manner to be explained later, the brake will release and the driving member of the clutch will move into operative engagement with the driven member of the clutch causing the drive shaft 108 and the feed roller 74a fixed thereon to begin rotating. Thus the feed roller can be rotated and stopped through operation of the clutch-brake mechanism 96.

The clutch-brake 98 is mounted on the transfer shaft 114 (FIG 4A) in a manner such that the driven member of the clutch is keyed to the transfer shaft 114 for unitary rotation therewith and the driving member of the clutch is bolted to the sprocket 112 which is arranged to be continuously driven through drive chain 116. It can therefore be seen that when the clutch is disengaged, the sprocket 112 will continue to be rotated by the motor 86 but the transfer shaft 114 will remain motionless with the brake portion of the clutch-brake mechanism 98 preventing the transfer shaft from rotating. When the clutch portion of the clutch-brake mechanism 98 is engaged, in a manner to be explained later, the brake will release and the driving member of the clutch will move into operative engagement with the driven member of the clutch causing the transfer shaft 114, and consequently the feed roller 76a, to rotate. Thus feed roller 76a can be rotated and stopped through operation of the clutch brake 98. It is evident, however, that even through the motor 86 is continuously running, the feed rollers 74a and 76 a can be alternately driven and stopped independently of each other.

The support shafts for the idler rollers 74b and 76b are journalled at one end in a bearing housing 131 supported from a cross frame member 133 at the center thereof. The other end of the support shaft for roller 74b is journalled in a support post 111a mounted on frame member 111 (FIG. 4A) and the other end of the support shaft for roller 76b is journalled in a support post mounted on frame member 129.

The motor 86 is also utilized to continuously rotate the conveyor rollers 78 which are journalled in bearings 130 (FIGS. 3 and 8) mounted in the longitudinally extending frame members 111 and 129 of the frame so as to lie in a horizontal plane. The motor is connected through a second gear box 132 (FIG. 4) to a drive shaft 134 having a drive pulley 136 fixed on the outer end thereof. A plurality of idler pulleys 138 (smaller in diameter than the drive pulley 136) are mounted in bearings 140 (FIGS. 5 and 6) disposed in the longitudinally extending frame member 111 of the frame 77 whereby the axes of rotation of the idler pulleys 138 are parallel to the longitudinal axis of the drive shaft 134. Near the downstream end of the longitudinally extending frame member 111, an idler pulley 141, identical in size to the drive pulley 136, is mounted with its rotational axis also parallel to the longitudinal axis of the drive shaft 134. A friction belt 142 is trained around the drive pulley 136 and the idler pulley 141, and the drive shaft 134 is arranged to be rotated in the direction of the arrow in FIG. 4 so as to cause the veneer which rests atop the conveyor rollers 78 to be moved longitudinally down the conveyor between the side frame members 111 and 129 thereof. The friction belt 142 is guided and supported by the smaller idler pulleys 138. It can be seen from FIGS. 4, 5 and 6 that the idler pulleys 138, on which the friction belt 142 rides, are disposed at an elevation slightly lower than the conveyor rollers 78 so that the conveyor rollers 78 will rest against and be rotated in a clockwise direction, as viewed in FIG. 4, by the friction belt 142 as it is continuously driven by the motor 86.

The horizontal conveyor rollers 78 are mounted on the frame 77 so that they lie at an oblique angle to each of the longitudinally extending frame members 111 and 129 with the end supported by frame member 129 slightly advanced of the end supported by frame member 111 (FIG. 3). With the rollers so mounted and caused to rotate, it will be apparent that the sheets of veneer being supported by the rollers will be urged toward the frame member 111 while they are simultaneously advanced toward the forward end of the alignment section 30 and into engagement with a stationary gate 144 (FIG. 3).

As mentioned previously, the alignment section 30 of the apparatus is provided with a stationary side wall 84, a movable outside fence 80, and a movable center fence 82. It is also provided at the forward end thereof with a transversely extending gate 144 that is normally closed to block the forward movement of the veneer on the rollers 78 but which can be opened, in a manner to be described hereinafter, to permit the aligned veneer to pass.

The outside fence 80 is normally disposed adjacent the frame member 129 as shown in FIG. 3, but under certain conditions it can be moved laterally toward the longitudinal center of the alignment section 30. The outside fence includes a longitudinally extending tubular body member 146 (FIGS. 5, 6 and 8) that lies beneath the level of the conveyor rollers 78 and supports, through a plurality of rigid upright mounting brackets 148 interspaced between every fourth conveyor roller, an inverted L-shaped sheet engaging plate 150. As shown in FIG. 3, the plate 150 extends parallel to the adjacent side frame member 129 over a greater part of the length of the alignment section. Welded to the underside of the tubular body member 146 and extending parallel to and inwardly toward the center of the overlying conveyor rollers 78 is an angle iron bracket 152 (FIGS. 6 and 8) with an abutment plate 154 welded onto its innermost end. A pair of support and guide rollers 156 are rotatably mounted on the angle iron bracket 152 and are provided with circumferential grooves so that they can ride upon a rail 158 running beneath and parallel to the angle iron bracket. The outside fence 80 can therefore be rolled along the cylindrical rail 158 to thereby shift the lateral position of the fence with respect to the veneer conveyor. The rail 158 is supported by a plurality of rigid strips 159 welded to the underside of a tubular frame member 161 which is secured at its ends to the side frame members 111 and 129. Upstream from the rail 158 is a second cylindrical rail 160 running parallel to and at the same elevation as rail 158. A support roller 162, which is rotatably mounted on a depending bracket 164 attached to the tubular body members 146, is arranged to be received upon the rail 160 (FIG. 8). The rail 160 is supported on a plurality of rigid strips 165 which are welded to the underside of a second tubular frame member 167 that lies transversely of the frame 77 and is secured at its ends to the side frame members 111 and 129. The roller 162 is provided to give additional support to the outside fence 80 whereby it can be easily shifted transversely to the direction of movement of the veneer.

The outside fence 80 is retained in its normal position adjacent side frame member 129 by a pneumatic cylinder 166 (FIG. 3) whose piston rod 168 in its extended position engages the end abutment plate 154 (FIG. 6) on the supporting angle iron bracket 152. A coil spring 170 (FIGS. 3 and 8) enclosed in a tubular housing 171 has one end attached to a bracket 169 (FIG. 6) depending from a longitudinally extending tubular frame member 174 which comprises a portion of the stationary side wall 84. The other end of the coil spring is attached to a turnbuckle 172 which is connected to a bracket 172a (FIG. 8) depending from the outside fence. The coil spring 170 therefore serves to bias the outside fence toward the longitudinal center of the alignment section under the restraint of the cylinder 166 and its projecting piston rod 168. The housing 171 for the spring 170 is supported by rigid strips 173 welded to the underside of the tubular bracket 161 adjacent to the rigid strips 159 which support the guide rail 158.

The center fence 82 is normally disposed (FIG. 5) approximately along the longitudinal center of the alignment section 30, but under certain circumstances it can be laterally shifted toward the stationary side wall 84. The center fence includes a longitudinally extending tubular body member 186 that lies parallel to and approximately at the same elevation as the body member 146 of the outside fence. The body member 186 supports, through a plurality of rigid upright brackets 187 interspaced between every fourth conveyor roller 78, a generally T-shaped sheet engaging plate 188 that extends longitudinally of the alignment section 30 for approximately the same distance as the plate 150 of the outside fence (FIG. 3). Welded to the underside of the tubular body member 186 and extending parallel to the conveyor rollers 78 toward the side wall 84 is an angle iron bracket 190 with an abutment plate 192 (FIGS. 6 and 7) depending therefrom near its center portion. A pair of support and guide rollers 194 are rotatably mounted on the angle iron bracket 190 and are provided with circumferential grooves which are arranged to be received upon a cylindrical rail 196 running parallel to and adjacent the rail 158 whereby the center fence can be shifted laterally with respect to the conveyor. Rail 196 is supported by the same rigid strips 159 which support the rail 158. A support roller 200 is rotatably attached to a depending bracket 202 (FIG. 7) on the upstream end of the tubular body member 186 so as to ride on the rail 160, similarly to the roller 162 on the outside fence, so that the center fence can be easily shifted in the lateral direction.

The center fence is retained in its normal position near the center of the alignment section 30 by a pneumatic cylinder 204 (FIGS. 3, 6 and 7) whose piston rod 206, in its extended position, engages the abutment plate 192 on the depending angle iron bracket 190 and pushes the fence against a fixed stop member 203 (FIG. 5) mounted atop the tubular frame member 167. The center fence may be caused to shift toward side wall 84 if the piston rod 206 is retracted. If a sheet of veneer is lying between the center fence and the outside fence when the outside fence is pulled laterally toward side wall 84 by the coil spring 170, it will be pinched between the fences to transmit the lateral movement of the outside fence to the center fence and thereby move the center fence toward the side wall 84.

The side wall 84 is comprised of a flat plate 207 arranged to overlie the veneer on the conveyor rollers 78. The plate is supported by a plurality of cylindrical posts 208 which are positioned between the conveyor rollers and which are mounted upon the upper surface of the tubular frame member 174.

It will be noted that the side wall 84, the center fence 82, the outside fence 80, and the gate 144 normally define a pair of longitudinally extending pockets 210 and 212 (FIG. 3) for receiving a pair of sheets of veneer fed by the feed rollers 74 and 76. It will be apparent that the sheet in pocket 210 will be urged by the conveyor rollers 78 against the side wall 84 as it is advanced to the gate 144 while the sheet in pocket 212 will be simultaneously urged against the center fence 82 as it is advanced by the conveyor rollers.

The gate 144 (FIGS. 3 and 9A) comprises an angle member 214 which is mounted upon a rod 218 that extends between the side frame members 111 and 129. The rod has its end portions pivotally mounted in bearings disposed on the side frame members so that the angle member 214 is free to move between an upright position, as shown in solid lines in FIG. 9A, and a lowered position, as indicated in phantom lines in FIG. 9A. In its upright position, the gate is seen to extend above the level of the conveyor rollers 78 where it will obstruct sheets of veneer being supported and conveyed by the conveyor rollers. The gate member 214 pivots about the axis of the rod 218 in response to movement of a link 220 rigidly attached to the end of the rod which projects through the side frame member 129. A pneumatic actuator 222 is pivotally mounted on a pin 224 attached to the side frame member 129. The actuator includes a projecting piston rod 226 having a head 226a which is pivotally connected to the link 220 for moving the gate between its two operative positions. It is apparent that when the piston rod 226 is extended (to the solid line position of FIG. 9A) the gate will be closed to retain sheets of material in the alignment section 30 upon the conveyor rollers 78, but when the piston rod is retracted (to the phantom line position shown in FIG. 9A) the gate will be opened to allow the sheets of material to be advanced, e.g., to the assembly station 32 of a plywood lay-up system. The operation of the pneumatic actuator 222 can be controlled manually by a worker A (FIG. 1) at the assembly station who will feed the aligned sheets forwardly when needed.

The aligning apparatus 20 is designed so that it can also feed full-sized sheets of middle veneer to the assembly station 32 rather than the half-width sheets described hereinbefore. When using the aligning apparatus to feed full-sized sheets, the center fence 82 is secured to the outside fence 80 so that full-sized sheets can be fed onto the conveyor rollers 78 by the nip rollers 74 and 76. To secure the center fence to the outside fence the depending plate 172a of the tubular body member 146 (FIG. 9) mounts a latch 232 adapted to removably receive a pin 234 carried by bracket 236 depending from the tubular body member 186 of the center fence. To latch the two fences together, it is only necessary to remove the stop member 203 mounted on the frame member 167 and roll the center fence 82 along its supporting rails 196 and 160 toward the side fence 80 until the two fences contact each other and become latched. When latched, the two fences will move as a unit and will follow the same operative pattern that the outside fence follows during normal operation.

The operation of the aligning apparatus 20 of the present invention is controlled by a plurality of switches and photocells which operate to cause the sheets of veneer to be advanced from the storage section 28 of the apparatus through the alignment section 30 and into the assembly station 32.

As can be seen in FIG. 1, four limit switches are mounted on the frame structure 37 of the storage section 28 of the apparatus —two normally closed limit switches 1LS and 2LS being located above and in vertical alignment with the stack M1 of veneer, and two normally closed limit switches 3LS and 4LS being located above and in vertical alignment with the stack M2 of veneer. Limit switches 1LS and 3LS, at the rearward ends of the stacks, serve to sense the elevation of the respective stacks of veneer. These switches are operative, through a control circuit to be described later, to maintain the elevation of the uppermost veneer in the stacks at a predetermined elevation adjacent the undersides of the corresponding vacuum heads 62 and 64. The normally closed limit switches 2LS and 4LS, which are located forwardly of switches 1LS and 3LS, are held open by the uppermost veneer in an associated stack (similarly to the switches 1LS and 3LS) but are allowed to close when the switch arm of either of the limit switches swings down through an aligned opening (not shown) in the corresponding support platform 42 and 44 when the last, or bottom, veneer is removed from the associated stack.

A normally closed limit switch 5LS (FIG. 1) is mounted on the base frame structure of elevator 40 in a position where it will be opened by the support platform 44 when the platform is in its lowermost position. An identical limit switch (not shown) is mounted on the frame of elevator 38 for the same purpose.

A pushbutton 1PB is mounted on one of the vertically extending posts of the frame structure 37 (FIG. 1) and is operative to raise the platform 44 of the elevator 40 by means of circuitry to be described hereinafter. Another pushbutton 2PB is provided in a location adjacent pushbutton 1PB for lowering the platform 44. Similar pushbuttons 3PB and 4PB are provided adjacent to pushbutton 1PB for raising and lowering, respectively, the platform 42 of elevator 38.

Referring now to FIG. 10, a circuit diagram is there shown for controlling the operation of the elevators 38 and 40. Inasmuch as the control circuit for the elevator 38 is identical to the control circuit for elevator 40, only the circuit for elevator 40 will be described. It is to be understood that the circuitry 252 controlling the operation of the elevator 38 would correspond identically to the circuitry 250 for controlling the operation of elevator 40. Looking at the circuitry 250, it will be seen that pushbutton 1PB is connected to the input set terminal 254 of a flip-flop circuit 256. Pushbutton 2PB is connected to one input terminal 258 of an OR gate circuit 260 whose output 261 is connected through a monostable multivibrator or "one shot" circuit 263 to the input reset terminal 262 of the flip-flop 256. The "OR" gate circuit 260 has two other input terminals 264 and 266 which are connected to the limit switches 2LS and 4LS respectively. The output terminal 268 of the flip-flop 256, which has a logit "1" (as indicated) when the flip-flop has been set, is connected to an input terminal 270 of an AND gate circuit 272. The only other input terminal 274 of the AND gate circuit 272 is connected to the normally closed limit switch 3LS. The output 276 of the AND gate circuit 272 is connected to a solenoid 1SOL that is operable connected to a valve (not shown) controlling the flow of air to the double-acting cylinder 46 of the elevator 40 to cause the cylinder to raise the platform 44 when the solenoid is energized. The output terminal 278 of the flip-flop 256, which has a logic "o" (as indicated) when the flip-flop has been set, is connected to an input terminal 280 of an AND gate circuit 282. The only other input terminal 283 of the AND gate circuit 282 is connected to the normally closed limit switch 5LS. The output terminal 284 of the AND gate circuit 282 is connected to a solenoid 2SOL that is operably connected to a valve (not shown) controlling the flow of air to the double-acting cylinder 46 to cause the cylinder to lower the platform 44 when the solenoid is energized. When neither of the solenoids 1SOL or 2SOL are energized, the control valve for the cylinder 46 assumes a neutral locking position in which the platform 44 is maintained at a constant height.

It will thus be seen that when the elevator 40 is in its lowered loading position, the limit switches 3LS and 4LS will be closed and limit switch 5LS will be held open by the platform 44. To raise the platform 44, it is only necessary to press pushbutton 1PB to set flip-flop 256 to provide a positive potential on input terminal 270 of the AND gate circuit 272. Inasmuch as the closed limit switch 3LS places a positive potential on the other input terminal 274 of the AND gate circuit 272, a positive potential will be placed on output terminal 276 to energize the solenoid 1SOL to cause the elevator cylinder 46 to extend and thereby raise the platform 44. The platform will continue to rise until the uppermost veneer in the stack M2 contacts and opens the limit switches 4LS and 3LS. The opening of limit switch 3LS (which occurs last) breaks the circuit through AND gate circuit 272 thereby de-energizing the solenoid 1SOL and stopping the upward movement of the platform. After several veneer have been removed from the stack M2 by the vacuum head 64 and fed to the alignment section 30 of the apparatus, the elevation of the uppermost veneer in the remainder of the stack will be at an elevation to allow limit switch 3LS to close. The closing of limit switch 3LS will again energize solenoid 1SOL, as before described, to cause the platform to raise until limit switch 3LS is again opened by the uppermost sheet of veneer. By this process the elevation of the uppermost veneer in the stack is self regulated so that the uppermost veneer is always immediately adjacent the vacuum head 64 for positive removal by the vacuum head. It should be noted that the switch arm of limit switch 4LS has a longer throw than the switch arm of limit switch 3LS, whereby the limit switch 4LS does not close each time several sheets of veneer have been removed from the stack. However, when the last sheet in the stack has been removed, the switch arm of limit switch 4LS falls through an opening (not shown) in the support platform 44 allowing the switch to close. It can be seen in FIG. 10 that when either limit switch 4LS associated with elevator 40 or the corresponding limit switch 2LS associated with elevator 38 closes, a positive potential is placed on the output terminal 261 of the OR gate circuit 260 to produce a pulse from the one shot circuit 263 and reset the flip-flop 256 thereby placing a positive potention on the output terminal 278. A positive potential is thereby placed on the input terminal 280 of the AND gate circuit 282. Since a positive potential is placed on the other input terminal 283 of the AND gate circuit 282 through closed limit switch 5LS, a positive potential is placed on the output terminal of AND gate circuit 282 to energize solenoid 2SOL. Energization of solenoid 2SOL, as stated hereinbefore, causes the cylinder 46 to lower the platform 44. Thus, when the last veneer is removed from either stack M1 or M2, the platform 44 will be caused to lower. It will be evident that the selective depression of push button 2PB will also cause the platform to lower even if neither limit switch 4LS or 2LS are closed.

In a similar manner, a circuit 252 (the details of which are similar to circuit 250 and are not shown) controls the operation of elevator 38 through solenoids 3SOL and 4SOL which cause the platform 42 of elevator 38 to be raised and lowered respectively.

As was stated hereinbefore, the aligning apparatus 20 is adapted to handle full-sized veneer as well as half-sized veneer. When the fences 80 and 82 are latched together and it is desired to handle fullsized veneer, the elevators 38 and 40 can be caused to operate together by placing the switch arms of two toggle switches 1TS and 2TS (FIG. 10) on terminals 286 and 288 respectively. This will connect solenoid 1SOL to solenoid 3SOL through a line 290 and will connect solenoid 2SOL and 4SOL through a line 292. It will thus be apparent that with the respective solenoids so connected, they will be caused to work together regardless of whether they get current from circuit 250 or from circuit 252.

As stated hereinbefore, the nip rollers 74 and 76 in the alignment section 30 of the apparatus are intermittently driven by the motor 86 through clutch-brake mechanisms 96 and 98 respectively. The operation of the clutch-brake mechanisms 96 and 98 (previously described) is controlled through a pneumatic system (not shown) by solenoids 5SOL and 6SOL respectively (FIG. 10A) which operate valves to permit the pneumatic pressure lines to the brake members and clutch members to be opened and closed. When solenoid 5SOL is energized, clutch-brake mechanism 96 is operative to provide a continuous drive to the feed roller 74a so that a sheet of veneer can pass into the alignment section 30. The same is true for solenoid 6SOL which controls the drive to feed roller 76a.

The solenoids 5SOL and 6SOL are energized when it is necessary to drive sheets of veneer into the alignment section 30 of the apparatus. However, they will be de-energized if the fences 80 and 82 and gate 144 are not in the proper positions to receive the sheets of veneer or if other sheets of veneer are already in the alignment section. As can be seen in FIGS. 1 and 3, a conventional photocell 1PC is mounted on the frame 77 of the alignment section in a position below the nip rollers 76 wherein it can sense the presence of a sheet of veneer which has just emerged from the downstream side of the nip rollers. A reflector (not shown) is mounted vertically above the photocell and above the level of the nip rollers 76 and is used to return the ray of light emanating at a location directly adjacent to the photocell so that it can be detected by the photocell. A corresponding photocell 3PC (whose corresponding reflector is also not shown) is mounted on the frame 77 to sense the presence of a sheet of veneer which has just emerged from the downstream side of the nip rollers 74. Longitudinally aligned with the photocells 1PC and 3PC and mounted on the frame 77 to sense the presence of veneer adjacent the gate 144 are two additional photocells 2PC and 4PC with adjacent light sources. The corresponding reflectors for directing the beam of light back to the photocell are mounted on the conveyor structure above the sheet feeding and aligning apparatus 20 of the present invention and are not shown. It will be apparent that photocell 2PC will sense the presence of a sheet of veneer which is adjacent the gate 144 and in pocket 212 and that photocell 4PC will sense the presence of a sheet of veneer which is adjacent the gate 144 and in pocket 210. Referring to FIGS. 3 and 5–8, it will be seen that three laterally spaced limit switches 6LS, 7LS and 9LS are mounted upon the downstream side of the tubular frame member 167 which runs parallel to the conveyor rollers 78 and connects the two side frame members 111 and 129. The limit switches 6LS, 7LS and 9LS serve to sense the position of the fences 80 and 82. It can be seen that switch contacting arms 300 and 302, connected to the underside of outside fence 80 and center fence 82, respectively, are used to operate the limit switches. Switch contacting arm 300 closes the normally open limit switch 6LS when the outside fence is retracted adjacent the side frame member 129, (FIG. 5), and switch contacting arm 302 closes the normally open limit switch 7LS when the center fence 82 is retracted to its center position (FIG. 5) in engagement with stop member 203. The normally open-limit switch 9LS will be closed by the contacting arm 300 when the outer fence 80 is moved inwardly toward center fence 82. Another normally open limit switch 8LS (FIG. 9A) is mounted on a projecting bracket 303 connected across the downstream end of the frame 77 and is used to sense the position of the gate 144. When the gate 144 is upright in its sheet retaining position, the limit switch 8LS will be held closed.

The circuitry for operating the various aforedescribed components of the alignment apparatus of the present invention is shown schematically in FIG. 10A. For the purpose of clarity and ease of illustration various of the photocells and limit switches are shown in more than one circuit, it being understood that each limit switch may comprise several sections operative in different circuits and that each photocell may control a relay which actuates contacts in several different circuits.

Referring now more particularly to FIG. 10A, it can be seen that the photocell 1PC is connected to one input terminal 308 of an OR gate circuit 310 the output of which is connected to the solenoid 6SOL of the clutch-brake mechanism 98. The other input terminal 312 of the OR gate circuit 310 is connected to the output terminal 314 of an AND gate circuit 316. The AND gate circuit 316 has an input terminal 318 connected to the normally open limit switch 6LS, an input terminal 320 connected to the normally open limit switch 7LS, an input terminal 322 connected to the normally open limit switch 8LS, and an input terminal 324 connected to the photocell 2PC.

Similarly, it can be seen that the photocell 3PC is connected to one input terminal 326 of an OR gate circuit 328 whose output terminal 330 is connected to the solenoid 5SOL of the clutch-brake mechanism 96. The other input terminal 332 of the OR gate circuit 328 is connected to the output terminal 334 of an AND gate circuit 336. The AND gate circuit 336 has an input terminal 338 connected to the normally open limit switch 6LS, an input terminal 340 connected to the normally open limit switch 7LS, an input terminal 342 connected to the normally open limit switch 8LS, and an input terminal 344 connected to the photocell 4PC.

It will thus be apparent that if photocell 1PC does not sense the presence of a sheet of veneer, i.e., if a sheet of veneer is not blocking the ray of light which is received by the photocell, a positive potential is placed on input terminal 308 of the OR gate circuit 310. Accordingly, a positive potential is placed on the output terminal 311 to energize the solenoid 6SOL which causes the engagement of the clutch portion of clutch-brake mechanism 98 to drive feed roller 76a. It will also be apparent that the solenoid 6SOL can be energized to cause the engagement of the clutch portion of clutch-brake mechanism 98 even if a sheet of veneer is fed through the nip rollers 76 to block the beam to the photocell 1PC. This can only happen when the following four conditions are fulfilled: (1) the outside fence 80 is retracted to side frame member 129 whereby limit switch 6LS will be held closed to put a positive potential on input terminal 318 of the AND gate circuit 316, (2) the center fence 82 is retracted against the center stop 203 whereby limit switch 7LS will be held closed to put a positive potential on input terminal 320 of the AND gate circuit 316, (3) the gate 144 is in its upright or closed position whereby limit switch 8LS is held closed to put a positive potential on input terminal 322, and (4there is no sheet of veneer blocking the beam to photocell 2PC adjacent the gate to place a positive potential on input terminal 324 of the AND gate circuit 316.

It will be readily apparent that the solenoid 5SOL, associated with clutch-brake mechanism 96 and feed roller 74a, can be energized in two ways similarly to the energization of solenoid 6SOL except that photocells 3PC and 4PC are utilized along with limit switches 6LS, 7LS and 8LS instead of photocells 1PC and 2PC.

As discussed hereinbefore, the outside fence 80 and the center fence 82 are mounted for lateral movement in the alignment section 30. This movement is controlled by the response from the photocells 2PC and 4PC at the discharge end of the apparatus and by the limit switch 9LS which senses the movement of the outer fence 80. These sensing means control the actuation of a pair of solenoids 7SOL and 8SOL which operate valves (not shown) that control the flow of air to and, hence, the projecting movement of the piston rods in pneumatic cylinders 204 and 166 respectively. As shown in FIG. 10A, photocells 2PC and 4PC are connected to the input terminals 350 and 352 respectively of a NOR gate circuit 354. The output of the NOR gate circuit is connected to the input terminal 356 of a monostable multivibrator or "one shot" circuit 358 whose output terminal 360 is connected to the input set terminal 362 of a flip-flop 364 and to the input set terminal 366 of a flip-flop 368.

The photocells 2PC and 4PC are also connected to the input terminals 370 and 372 respectively of an AND gate circuit 374. The output of the AND gate circuit 374 is connected to the input 376 of a one shot circuit 378 whose output terminal 380 is connected to the input reset terminal 382 of the flip-flop 364. The normally open limit switch 9LS, that is held closed when the outside fence 80 is advanced a predetermined distance toward the side wall 84, is connected to the input reset terminal 384 of the flip-flop 368. The output terminal 386 of the flip-flop 368, whose logic level is "O" (as indicated) when the flip-flop is set, is connected to the solenoid 8SOL associated with the outside fence 80.

It can be seen that when sheets of veneer are in the pockets 210 and 212 with their forward ends abutting against the gate 144, the rays of light to the photocells 2PC and 4PC will be blocked that the photocells are not conducting. Under these circumstances a "O" potential is on the input terminals 350 and 352 of the NOR gate circuit 354 so that a positive potential is placed on the input terminal 356 of the one shot circuit 358. This causes a pulse of positive potential to be delivered to the input set terminal 362 of flip-flop 364 and on the input set terminal 366 of the flip-flop 368 to set each of the flip-flops. When the flip-flops 364 and 368 are set, a "0" potential is placed on the output terminals 388 and 386 of the flip-flops. Accordingly, the solenoids 7SOL and 8SOL are de-energized so that the piston rods of the pneumatic cylinders 204 and 166, respectively, are permitted to be retracted. When the piston rods are allowed to be retracted, the spring 170, which is operably connected to outside fence 80, pulls the outside fence toward the side wall 84. As the fence moves toward the side wall, it engages the sheet of veneer V2 (FIG. 6) that is in pocket 212 and urges it toward the side wall. The veneer V2 subsequently engages the center fence 82 which then is also urged toward side wall 84. The center fence, upon moving toward the side wall 84, engages veneer V1 (FIG. 6) in pocket 210 and urges the veneer V1 into abutment with the side wall. It can thus be seen that after this sequence of events the veneer V1 will be in abutment with the side wall 84 along one side thereof, in abutment with the center fence 82 on the other side thereof, and in abutment with the gate 144 at the forward end thereof. Also, veneer V2 will be aligned alongside sheet V1 being separated therefrom only by the thickness of the plate 188 of the center fence. One longitudinal edge of veneer V2 will be in abutment with the center fence while the opposite longitudinal edge thereof is in abutment with the outside fence and the forward end thereof is in abutment with the gate 144. This desired aligned positioning of the veneer V1 and V2 is shown in phantom lines in FIG. 6.

Just as the outside fence 80 reaches the phantom line position of FIG. 6, the switch contacting arm 300, which is carried thereby, will contact and close limit switch 9LS. As can be seen from FIG. 10A, the closing of limit switch 9LS places a positive potential on the input reset terminal 384 of the flip-flop 368. This resets the flip-flop and reverses its output so that a positive potential is placed on the output terminal 386 to energize solenoid 8SOL. Energization of 8SOL causes the piston rod 168 of pneumatic cylinder 166 to extend and drive the outside fence back to its position adjacent side frame member 129. The sheets of veneer V1 and V2 will remain in their phantom line positions, however, since the conveyor rollers 78 are angled to urge both sheets of veneer toward the side wall 84.

When operator A at the assembly station 32 is ready for the aligned sheets of middle veneer V1 and V2, he presses one of the switches 34 at the assembly station to energize a solenoid (not shown) that is operably connected to a valve controlling the flow of air to the pneumatic actuator 222 (FIG. 9A) to thereby cause the gate 144 to pivot downwardly to its open position. When the gate opens the continuously driven conveyor rollers 78 push the aligned sheets out to the assembly station. When the trailing edge of the sheets of veneer V1 and V2 pass beyond the photocells 2PC and 4PC, the respective photocells will begin to conduct. This action will cause a positive potential to be placed on the two input terminals 370 and 372 of the AND gate circuit 374 which places a positive potential on the input terminal 376 of the one shot circuit 378. This, in turn, causes a pulse of positive potential to be delivered to the input reset terminal 382 of the flip-flop 364 changing the output of the flip-flop so that a positive potential is placed on output terminal 388 to energize solenoid 7SOL. Energization of solenoid 7SOL will cause the piston rod 206 of cylinder 204 to be extended to drive the center fence 82 back to its retracted position against the center stop member 203.

As was discussed hereinbefore, the carriage 58, which carries the vacuum heads 62 and 64 in the storage section 28 of the alignment apparatus, is mounted for reciprocal movement whereby it is able to pick up the top sheets of veneer in the stacks M1 and M2 and advance them to the nip rollers 74 and 76. The carriage is reciprocated by the double-acting pneumatic cylinder 60 whose functioning is regulated by a solenoid 9SOL which operates a two position valve (not shown) controlling the flow of pressurized air to opposite ends of the cylinder whereby when the solenoid is energized the carriage is caused to move in a downstream direction and when it is de-energized the carriage is caused to move in a downstream direction.

The operation of the solenoid 9SOL is controlled by the circuit shown in FIG. 10A. It will there be seen that the photocells 1PC and 3PC adjacent the nip rollers 76 and 74 are connected to the input terminals 396 and 398 respectively of an OR gate circuit 400 and to the input terminals 402 and 404 respectively of a NOR gate circuit 406. The output of the OR gate circuit 400 is connected to the input terminal 408 of a one shot circuit 410 whose output is connected to one input terminal 412 of an OR gate circuit 414. A normally open limit switch 10LS (FIG. 1) is mounted on the frame 37 of the storage section 28 adjacent the limit switch 2LS and is disposed so that the carriage 58 will contact and close the switch when the carriage is retracted to its upstream position. The limit switch 10LS is connected to the input set terminal 416 of a flip-flop and to the input reset terminal 420 of a flip-flop 422. The input reset terminal 424 of the flip-flop 418 is connected to the output terminal 426 of the NOR gate circuit 406. The output terminal 428 of the flip-flop 418 is connected to the input terminal 430 of a time delay circuit 432 which will not conduct a current until a predetermined time (approximately 2 ½ seconds in the veneer feeding application disclosed) after a positive potential has been placed on the input terminal 430. The output terminal 434 of the time delay circuit 432 is connected to the other input terminal 436 of the OR gate circuit 414 whose output terminal 438 is connected to the input set terminal 440 of the flop 422.

The output terminal 442 of flip-flop 422, which has a logic output "1" (as indicated) when the flip-flop is set is connected to one input terminal 444 of an AND gate circuit 446 whose output terminal 448 is connected to the solenoid 9SOL for effecting reciprocation of the carriage 58. The other input terminal 450 of the AND gate circuit 446 is connected to the output terminal 452 of a NAND gate circuit 454 whose two input terminals 456 and 458 are connected to the normally closed limit switches 2LS and 4LS respectively which are held open by the stacks M1 and M2 of veneer and which will only be allowed to close after the last sheet of veneer in the associated stack M1 or M2 has been removed.

It will be apparent from the aforedescribed circuitry that when there are stacks M1 and M2 of veneer in the storage section 28 so that the limit switches 2LS and 4LS are held open a positive potential will be placed on the output terminal 452 of the NAND gate circuit 454 and on the input terminal 450 of the AND gate circuit 446. If at least one of the sets of nip rollers 74 and 76 has no veneer protruding therethrough so that at least one of the photocells 1PC or 3PC is conducting, the one shot circuit 410 will deliver a pulse to the input terminal 412 of the OR gate circuit 414. This will cause a positive potential to be placed on the input set terminal 440 of the flip-flop 422 to set the flip-flop so that a positive potential will be placed on the output terminal 422 and the input terminal 444 of the AND gate circuit 446. Since the limit switches 2LS and 4LS are held open by the stacks of veneer M1 and M2 during the feeding of the sheets to the alignment apparatus, a positive potential will be placed on the output terminal 452 of the NAND gate circuit 454 thereby placing a positive potential on the other input terminal 450 of the AND gate circuit 446. With a positive potential on both input terminals of the AND gate circuit 446 a positive potential will be placed on the output terminal 448 to energize the solenoid 9SOL. As stated hereinbefore, when the solenoid 9SOL is energized the piston rod of the pneumatic cylinder 60 is caused to retract to draw the carriage in an upstream direction. When the carriage reaches its extreme retracted position, it will close the normally open limit switch 10LS which sets the flip-flop 418 and resets the flip-flop 422. When the flip-flop 422 is reset, the positive potential on the output terminal 422 is removed consequently removing the positive potential on the output terminal 448 of the AND gate circuit 446 to deenergize the solenoid 9SOL. This causes the piston rod on the pneumatic cylinder 60 to extend forcing the carriage 58 to move in the downstream direction carrying with it, via the vacuum heads 62 and 64, two sheets of veneer. The sheets of veneer picked up by the vacuum heads are fed into the nip rollers 74 and 76 which continue to advance the veneer until the light rays to both photocells 1PC and 3PC have been broken. The closing of limit switch 10LS, in addition to initiating the return movement of the carriage, also sets the flip-flop 418 so that the time delay circuit 432 is energized. If the light beams to both of the photocells 1PC and 3PC are not broken within the predescribed time (about 2 ½ seconds) to reset the flip-flop 418 through the NOR gate circuit 406 and thereby de-energize the time delay, a positive potential will be placed on the input terminal 436 of the OR gate circuit 414 by the time delay circuitry. A positive potential on the input terminal 436 will again set the flip-flop 422 and thereby energize the solenoid 9SOL through the AND gate circuit 446 to cause the carriage to move upstream again. If, however, a sheet of veneer is fed from each stack M1 and M2 into the nip rollers 74 and 76 within the required time (which will occur if two sheets are picked up by the vacuum head) then the flip-flop 418 will be reset before the solenoid 9SOL can be energized and the carriage will be left in its downstream position to allow the sheets to be fed into the alignment apparatus. As soon as the trailing ends of the sheets have passed beyond the photocells 1PC and 3PC so that the photocells are again conducting, the solenoid 9SOL will again be energized through OR gate circuit 400, one shot circuit 410, OR gate circuit 414, flip-flop 422, and the AND gate circuit 446 to cause the carriage to again move upstream to pick up another pair of sheets. It will be apparent that if by chance one of the vacuum heads 62 or 64 does not pick up a sheet of veneer, the carriage will be caused to retract and pick up the missing sheet and will continue to thus recycle until a sheet is in both of the nip rollers blocking both photocells 1PC and 3PC.

The operation of the alignment apparatus 20 will further be understood by reference to FIGS. 11A through 11D wherein diagrammatic plan views of the apparatus in its different stages of operation are shown. In FIG. 11A a portion of the stacks M1 and M2 of veneer are shown in the storage section 28 with the uppermost sheet V1 and V2 of the respective stacks advanced through the nip rollers 74 and 76 whereby the downstream end of the sheets are blocking the photocells 3PC and 1PC respectively. The vacuum heads 62 and 64 are stationary at this time. It will be noted that the outside fence 80 and the center fence 82 are in their retracted positions and that the gate 144 is in its closed position with the photocells 4PC and 2PC unblocked and therefore conducting. Under this set of conditions, the feed rollers 74a and 76a are caused to be driven so that the sheets V1 and V2 are advanced into the pockets 210 and 212 of the alignment section 30.

Once the sheets V1 and V2 are into the alignment section 30 they will be supported by the conveyor rollers 78 which advance them into abutting contact with the closed gate 144 (FIG. 11B). As soon as the trailing ends of the sheets passes beyond the photocells 3PC and 1PC, the carriage carrying the vacuum heads 62 and 64 is retracted to pick up the next pair of sheets V3 and V4 in each stack (FIG. 11B).

When the sheets V1 and V2 are moved over the photocells 4PC and 2PC so that these photocells no longer conduct, the outside fence 80 is caused to move laterally toward the center fence 82. As the sheet V2 becomes pinched between the two fences, the center fence is forced toward the side wall 84 and pushes the sheet V1 in the same direction. Ultimately, sheet V1 is aligned with and abutting against the side wall 84 and sheet V2 is aligned with and abutting against the center fence 82 (FIG. 11C). When the two sheets V1 and V2 become aligned, the outside fence will be retracted, as indicated by the directional arrows in FIG. 11C, and will remain retracted until the next two sheets V3 and V4 are advanced into the alignment section. The center fence 80, however, does not retract until after the sheets V1 and V2 have been advanced out of the apparatus, and the sheets cannot move out of the apparatus until the operator opens the gate 144 to allow the conveyor rollers 78 to move them out.

In FIG. 11D, the sheets V1 and V2 have been moved out of the apparatus, and the next two sheets V3 and V4 are being advanced into the alignment section 30 where an identical sequence of operations will take place to align them and subsequently move them out of the apparatus.

From the foregoing description it will be appreciated that the apparatus of the present invention provides a means whereby sheets of relatively fragile material, such as plywood veneer, can be aligned on a conveyor and placed in abutting side-by-side relationship. The apparatus will operate efficiently without jamming and without causing overlapping of the sheets or damage to the sheets.

Although the best mode contemplated for carrying out the present invention has been herein shown and described, it will be apparent that modification and variation may be made without departing from what is regarded to be the subject matter of the invention.

What is claimed is:

1. An apparatus for aligning sheets of material in side-by-side relationship comprising in combination a frame having an input end and an output end, conveyor means mounted on said frame for advancing said sheets of material from the input end to the output end of the frame, a gate at said output end which is alternately movable between open and closed positions, means for moving said gate between said open and closed positions, a stationary side wall extending substantially from the input to the output end of said frame along one side thereof, a first fence means extending substantially parallel to said side wall along the other side of said frame and being mounted for movement toward and away from said side wall, a second fence means extending substantially parallel to said first fence means between said first fence means and said side wall and also being mounted for movement toward and away from said side wall, said first and second fence means having retaining means for selectively holding the fence means in their positions furthest removed from said side wall, means operatively associated with said first fence means for moving said first means toward said side wall, and control means for controlling said movement of said first and second fence means.

2. The apparatus of claim 1 further including feeding means near said input end for selectively feeding sheets of material between said side wall and said second fence means and between said second fence means and said first fence means.

3. The apparatus of claim 2 wherein said feeding means includes rotatably mounted nip rollers having parallel axes of rotation, said rollers being spaced such that the sheet material cannot pass therebetween unless the nip rollers are rotated.

4. The apparatus of claim 3 including drive means for selectively rotating one of said nip rollers. flip-flop 442.

5. The apparatus of claim 1 wherein said conveyor means includes a plurality of rotatably mounted conveyor rollers having their rotational axes extending transversely of said side wall and said fence means, said conveyor rollers having one end rotatably mounted adjacent said side wall and the other end rotatably mounted adjacent said first fence means when said first fence means is in its farthest removed position from said side wall.

6. The apparatus of claim 5 further including means for rotating said conveyor rollers in a manner such that the sheet material supported by said conveyor rollers will be moved from the input to the output end of said frame.

7. The apparatus of claim 6 wherein the end of each of said conveyor rollers mounted adjacent said first fence means is closer to the output end of said frame than the corresponding end of each of said conveyor rollers mounted adjacent said side wall whereby sheet material supported by said conveyor rollers will be urged toward said side wall as it is moved toward the output end of said frame.

8. The apparatus of claim 1 wherein said retaining means for said first and second fence means comprises first and second power cylinders respectively each having extensible piston rods for operably engaging said first and second fence means.

9. The apparatus of claim 8 wherein said means for moving said first fence means toward said side wall comprises resilient means biasing said first fence means toward said side wall.

10. The apparatus of claim 1 further including storage means for storing stacks of the sheet material and means for delivering pairs of sheets from said stacks to said frame.

11. The apparatus of claim 10 further including control means for controlling the operation of said delivery means so that said sheet material is only delivered to said frame when said frame is empty.

12. The apparatus of claim 11 wherein said control means includes sheet sensing means adjacent said sheet delivery means and adjacent said gate for sensing the presence or absence of sheets of material at the respective locations.

13. The apparatus of claim 12 wherein said sheet sensing means comprise photo-electric cells.

14. The apparatus of claim 11 wherein said control means includes detection means for detecting the presence of said first and second fence means in their positions furthest removed from said side wall.

* * * * *

PO-1050
(5/69)

UNITED STATES PATENT OFFICE
CERTIFICATE OF CORRECTION

Patent No. 3,717,336          Dated    February 20, 1973

Inventor(s)    CHARLES R. SHORT ET AL

It is certified that error appears in the above-identified patent and that said Letters Patent are hereby corrected as shown below:

```
Column 10, line 40 - change "logit" to -- logic --.
Column 11, line 46 - change "potention" to -- potential --.
Column 16, line 52 - after -- the -- insert "flip-".
Column 19, line 32 - after -- first -- insert "fence".
Column 19, line 46 - delete "flip-flop 442".
```

Signed and sealed this 14th day of January 1975.

(SEAL)
Attest:

McCOY M. GIBSON JR.
Attesting Officer

C. MARSHALL DANN
Commissioner of Patents